United States Patent
Annen et al.

(10) Patent No.: US 10,422,640 B2
(45) Date of Patent: Sep. 24, 2019

(54) DIGITAL MAGNETIC COMPASS COMPENSATION

(71) Applicant: Safran Vectronix AG, Heerburgg (CH)

(72) Inventors: Ivo Annen, Schindellegi (CH); Silvio Gnepf, Heerbrugg (CH)

(73) Assignee: Safran Vectronix AG, Heerbrugg (CH)

( * ) Notice: Subject to any disclaimer, the term of this patent is extended or adjusted under 35 U.S.C. 154(b) by 808 days.

(21) Appl. No.: 14/326,021

(22) Filed: Jul. 8, 2014

(65) Prior Publication Data

US 2015/0012234 A1     Jan. 8, 2015

(30) Foreign Application Priority Data

Jul. 8, 2013   (EP) .................................. 131755663

(51) Int. Cl.
    *G01C 17/38* (2006.01)
    *G01C 17/28* (2006.01)

(52) U.S. Cl.
    CPC ............ *G01C 17/38* (2013.01); *G01C 17/28* (2013.01)

(58) Field of Classification Search
    CPC ...................................................... G01C 21/16
    USPC ....... 702/12, 19, 92, 93, 104, 141, 150, 151, 702/153, 189; 33/321; 175/45; 324/303; 340/429
    See application file for complete search history.

(56) References Cited

U.S. PATENT DOCUMENTS

| | | | |
|---|---|---|---|
| 4,109,391 A * | 8/1978 | Wing ..................... | G01C 19/38 33/275 G |
| 5,369,889 A | 12/1994 | Callaghan et al. | |
| 6,009,629 A | 1/2000 | Gnepf et al. | |
| 6,144,308 A * | 11/2000 | Dunne ................... | G01C 15/00 340/429 |
| 7,421,340 B2 | 9/2008 | Ladetto et al. | |
| 2003/0085059 A1* | 5/2003 | Kuckes ................... | E21B 7/068 175/45 |

(Continued)

OTHER PUBLICATIONS

D. Gebre-Egziabher et al: "A Non-Linear, Two-Step Estimation Algorithm for Calibrating Solid-State Strapdown Magnetometers"; Proceedings of the International Conference on Integrated Navigation System, pp. 290-297 (2001).

(Continued)

*Primary Examiner* — Ricky Ngon
(74) *Attorney, Agent, or Firm* — Muncy, Geissler, Olds & Lowe, P.C.

(57) ABSTRACT

The invention relates to a method for a field compensation of an electronic compass for influences to a geomagnetic field by magnetic objects in the vicinity of the compass, that is done with acquiring a magnetic field value by a magnetic field sensor and acquiring an inclination with respect to level plane by an accelerometer, in a discrete set of multiple orientations of the compass.

Therein, a user guidance for subsequently orienting the compass into a predetermined desired range of orientation is provided to the user. In the following, compensation data are calculated from those magnetic sensor acquisitions to compensate for the influences in such a way, that a magnetic north heading is determinable based on the compensated magnetic field values.

Therein, the user guidance for the compensation is done with a gathering of directional information based on rotary rate readings from a gyroscope for an azimuthal component of the orientation.

16 Claims, 6 Drawing Sheets

(56) References Cited

U.S. PATENT DOCUMENTS

| | | | |
|---|---|---|---|
| 2005/0022402 A1* | 2/2005 | Ash | G01C 21/16 33/321 |
| 2005/0030021 A1* | 2/2005 | Prammer | G01V 3/32 324/303 |
| 2006/0031014 A1 | 2/2006 | Sato et al. | |
| 2008/0040068 A1 | 2/2008 | Phillips | |

OTHER PUBLICATIONS

Savage: "Strapdown Analytics, Part 1"; Strapdown Associates, Inc.; pp. 3-56-3-57 (2000).
Press et al: "Numerical Recipes"; Cambridge University Press; pp. 155-159 (2007).
European Search Report and Written Opinion issued in EP Application No. 13 17 5563 on Dec. 13, 2013.

* cited by examiner

Only elevation:

| Shot | 1 | 2 | 3 | 4 | 5 | 6 | 7 | 8 | 9 | 10 | 11 | 12 |
|---|---|---|---|---|---|---|---|---|---|---|---|---|
| Azimuth | 0° | 90° | 180° | 270° | 0° | 90° | 180° | 270° | 0° | 90° | 180° | 270° |
| Elevation | 30° | 30° | 30° | 30° | 0° | 0° | 0° | 0° | -30° | -30° | -30° | -30° |
| Bank | 0° | 0° | 0° | 0° | 0° | 0° | 0° | 0° | 0° | 0° | 0° | 0° |

Only bank:

| Shot | 1 | 2 | 3 | 4 | 5 | 6 | 7 | 8 | 9 | 10 | 11 | 12 |
|---|---|---|---|---|---|---|---|---|---|---|---|---|
| Azimuth | 0° | 0° | 0° | 90° | 90° | 90° | 180° | 180° | 180° | 270° | 270° | 270° |
| Elevation | 0° | 0° | 0° | 0° | 0° | 0° | 0° | 0° | 0° | 0° | 0° | 0° |
| Bank | 30° | 0° | -30° | 30° | 0° | -30° | 30° | 0° | -30° | 30° | 0° | -30° |

Fig. 3a

| Shot | 1 | 2 | 3 | 4 | 5 | 6 | 7 | 8 | 9 | 10 | 11 | 12 |
|---|---|---|---|---|---|---|---|---|---|---|---|---|
| Azimuth | 0° | 0° | 0° | 90° | 90° | 90° | 180° | 180° | 180° | 270° | 270° | 270° |
| Elevation | 30° | 0° | -30° | 30° | 0° | -30° | 30° | 0° | -30° | 30° | 0° | -30° |
| Bank | 0° | ±30° | 0° | 0° | ±30° | 0° | 0° | ±30° | 0° | 0° | ±30° | 0° |

Fig. 3b

| Shot | 1 | 2 | 3 | 4 | 5 | 6 | 7 | 8 | 9 | 10 | 11 | 12 |
|---|---|---|---|---|---|---|---|---|---|---|---|---|
| Azimuth | 270° | 270° | 270° | 300° | 300° | 300° | 30° | 30° | 30° | 90° | 90° | 90° |
| Elevation | 30° | 0° | -30° | 30° | 0° | -30° | 30° | 0° | -30° | 30° | 0° | -30° |
| Bank | 0° | 30° | 0° | 0° | 30° | 0° | 0° | 30° | 0° | 0° | 30° | 0° |

Fig. 3c

DIGITAL MAGNETIC COMPASS COMPENSATION

CROSS-REFERENCE TO RELATED APPLICATIONS

This application claims priority to European Patent Application No.: 13175563.9, which was filed in Europe on Jul. 8, 2013, and which is herein incorporated by reference in its entirety.

BACKGROUND OF THE INVENTION

The present invention relates generally to a method for a field compensation of an electronic compass according to claim 1, to a handheld observation device with a field compensatable electronic geomagnetic compass functionality according to claim 6, to a digital magnetic compass module according to claim 12 and to a computer program product.

The present invention relates to a setup and method for a compensation of an electronic magnetic compass, in particular a Digital Magnetic Compass (DMC). Such an electronic compass can for example be integrated into a surveillance or observation device for providing north-referenced azimuthal orientation information of a direction or target aimed by a Line of Sight (LOS) of the device, for example north referenced azimuth information of an optical axis of an observation device. Such an observation device can for example be a sighting device such as monocular or a binocular, night vision equipment, telescopic sight, periscope, etc. with a fully optical or partially electronic observation path. Beside the DMC discussed in this application, such an observation device can be equipped with or connected to additional sensors and measurement equipment such as goniometers for determining elevation and/or bank information of the LOS, an electronic distance meter (EDM) such as a Laser Range Finder (LRF) for determining a distance to a target aimed with the LOS, navigation-, mapping- and location-equipment like a GNNS-Receiver (GPS, GLONASS, GALILEO, . . . ), wired or wireless remote controllers and/or displays, image or video capturing units, thermographic cameras, Range Imaging cameras (RIM), etc. Examples for such observation devices are the Vectronix Moskito, Vector, PLRF or JIM LR.

DMCs (as well as other sorts of magnetic compasses) are influenced in their heading determination by ferromagnetic and/or electromagnetic objects interfering with the geomagnetic field of the planet. Ferrous or permanent magnetic objects as well as electrical currents result in a disturbance of the geomagnetic field at the magnetic sensing unit which is used to determine the magnetic fields for magnetic compassing. Those disturbances can falsify the determined north reference or even render a determination of a magnetic north reference impossible. Therefore, such magnetic influences need to be compensated from the uncompensated, raw magnetic field measurements by the magnetic sensors of the compass in order to determine a magnetic compass bearing.

The methods for a possible further determination of a true bearing or grid north by taking into account the local declination are known in the art, as well as the therefore used reference models like the IGRF or WMM. The present invention only explains the basis for latter, namely a correct determination of a true bearing referenced to the local geomagnetic field—giving magnetic compass north—which will be also referenced as azimuth, for example given in units of degrees, degrees west/east, mils or grads. Nevertheless, the abovementioned further corrections of the magnetic compassing, for example to gain the direction of the magnetic north pole, the geographic north pole or another derivable geographically referenced azimuth direction are not excluded, although they will not be discussed here in detail.

If a digital magnetic compass is for example built into an observation device as described above, a magnetic compensation is needed to remove the influence of magnetic parts within the device itself or attached to the device, like e.g. a rifle attached to a telescopic sight to be used as observation device with the electronic compass. Those magnetic parts are in particular ferromagnetic parts, electronic equipment and/or batteries as sources of magnetic fields by therein occurring electric currents. The parts can be located within the device, like in an integrated LRF, display, camera, computation means, electric actuators (with or without permanent magnets), components made of iron, screws, bolts, etc. or they can be close to and moved with the device, like glasses or a helmet worn by the user of the observation device, a part of a vehicle where the observation device is attached to or other parts influencing magnetic fields which have a (relatively) defined arrangement with respect to the magnetic sensors of the compass.

To achieve such a compensation, the article "A NON-LINEAR, TWO-STEP ESTIMATION ALGORITHM FOR CALIBRATING SOLID-STATE STRAPDOWN MAGNE-TOMETERS" by D. Gebre-Egziabher, G. H. Elkaim, J. D. Powell and B. W. Parkinson from the Department of Aeronautics and Astronautics at Stanford University, published in Proceedings of the International Conference on Integrated Navigation System, St. Petersburg Russia, May 28-30, 2001, pp. 290-297, explains the principles of magnetic compass compensation and an example of method for solving such.

U.S. Pat. No. 6,009,629 discloses a method to determine the direction of the Earth's magnetic field in the case of interference by magnetic material built into equipment. For this purpose, an electronic magnetic compass mounted on the equipment is brought into N different spatial positions, where magnetic field and inclination angles measured in a magnetic compensation procedure. The thereby gathered data allows the use of a mathematical algorithm to determine the true earth field and remove the disturbances by therein presented magnetic compensation formulas.

Electronic magnetic compasses are for example available as pre built modules like the Vectronix DMC-SX, which already provides the basic routines and algorithms for the execution of such a compensation in their firmware. Those digital compass modules can be built into an observation device, which provides additional functions like day and night observation, laser range-finding, as discussed above.

For gathering data for the compensation, a prescribed pattern of geometric compensation-measurement orientations, which provide sufficient information for the determination of the magnetic compensation parameters, is desired. Although there are many possible embodiments for such patterns for gathering data needed for the compensation calculation, there are certain patterns which are advantageous in view of the acquired data, number and sequence of points, and also of the achievability of those orientations by nature of the device and setup comprising the compass, etc. Depending on the ambient conditions, there can be certain optimal patterns as discrete sets of multiple orientations of the compass respectively the device comprising the compass, which are preferable for a certain compensation task.

As the compensation patterns can be relatively complicated for an inexperienced user (see e.g. FIG. 1 and FIG. 2 discussed below), it is advantageous to guide the user to the positions, which are described by their relative azimuth, elevation and bank, not only by paper instructions but with the help of a display and software of the observation device. Thereby, the user is interactively guided by the user interface to aim the device into a set of desired geometric orientations (azimuth, pitch, roll) for the compensation measurements.

The orientations of the device do not need to be aimed with high precision. For example, a range of roughly about ±20° in azimuth and ±10° in elevation and bank are in general sufficient to gather reasonable compensation data. A typical compensation procedure covering all the desired orientation can for example be executed in the order of about one minute.

For the purpose of user guidance for the compensation data acquisition, the angles provided by the compass itself are used to guide the user to the desired orientations of the set. This is no problem for elevation and bank as those can be determined according to the direction of gravity by accelerometers with more than reasonable accuracy for the user guidance, but it can become too imprecise or even impossible for azimuth in case of severe magnetic disturbances, for example due to magnetic batteries mounted too closely to the compass due to the smallness of the device.

When the magnetic field is too disturbed to provide even the low accuracy azimuth needed for the guidance, such a built-in user guidance based on the uncompensated internal magnetic compass no longer works. This problem is getting worse in a growing amount of cases, in particular caused by smaller sizes of the devices, stronger magnetism of batteries and also bad construction (battery too close to DMC) of some devices. Also, the increased electrification of the equipment and more and more soft-, hard- and/or electromagnetic items in the vicinity of the magnetic compass sensors increases those problems.

Even if the patterns to be subsequently aimed with the device for compensation are tried to be kept so simple that a user should also be able to execute them without guidance, once guidance is offered by the device as standard routine or in particular if such a compensation guidance routine is already started and/or at least partially executed, it should be executable and possible to complete in any instance. A simple "compensation failed", "compensation not possible" or "guidance impossible" message or a termination without a result is not acceptable.

For devices which are used stationed on an earth fixed support, e.g. on a tripod, with a horizontal rotatable platform equipped with a goniometer, an azimuth encoder can be used for determining the device's orientation for achieving the desired compensation pattern. Nevertheless, the requirement for such goniometers and a stationary base results in a more complex system is not applicable in many used cases, e.g. for a handheld device.

Other known compensation solutions, as for example used for an electronic compass in mobile devices such as a smartphone or a satnav, only allow a quick and dirty compensation of some of the influences. For example to spin the device around its horizontal axis or to move the device continuously in a Möbius strip for calibration cannot compensate all the influences in a decent manner to achieve the desired accuracy in a range of a few degrees or less, as e.g. also explained in abovementioned U.S. Pat. No. 6,009,929. Furthermore, such a movements along a three dimensional 8-shaped path are quite difficult to explain and to execute for an inexperienced user or when the device is attached to some object. The approach presented here is different to those approaches which can only achieve a partial compensation with much lower accuracy and reliability. In the presently discussed approach accuracies in the region of a few degrees, preferably below 0.5° or less are desired, in particular for observation devices. Such accuracies are far below the ones required for car navigation systems or for determining the orientation of a mobile phone.

BRIEF SUMMARY OF THE INVENTION

It is therefore an object of the present invention to provide an improved compensation for an electronic magnetic compass, which can be executed regardless of harsh environmental conditions.

It is a particular object to provide a compensation guidance for a digital magnetic compass which does not rely on measurements of the uncompensated digital magnetic compass itself.

Another object is to provide a small and cheap solution, in particular a solution which can also be retrofitted to an already constructed observation device or integrated into an exiting DMC-module. Preferably, wherein the DMC-module has a form factor, communication interface and communication protocol which are compatible to those of a prior art module.

Therefore, it is an object to provide a digital magnetic compass module which provides a compensation routine that can be executed regardless of the magnetic distortions in the surrounding, in particular wherein a user-guidance for the compensation data acquisition can always be provided.

It is also an object to provide an observation device which's size and internal setup is not restricted by the used digital magnetic compass and where the compass's compensation and the respective guidance can always be executed, in particular unaffected by an unfavourable device construction.

It is an object of the present invention to offer a method to provide sufficiently reliable azimuth information for user guidance for a Digital Magnetic Compass (DMC) compensation pattern in case of severe magnetic disturbances.

These objects are achieved by realising the features of the independent claims. Features which further develop the invention in an alternative or advantageous manner are described in the dependent patent claims.

With respect to abovementioned objects, a method for a field compensation of an electronic compass for influences to a geomagnetic field by magnetic objects in the vicinity of the compass is presented. The magnetic objects can in particular be soft-magnetic objects, hard-magnetic objects and/or objects carrying electrical currents. The compass can for example be comprised in a handheld observation device and the magnetic objects to be compensated for can in particular be part of this device or fixedly attached thereto.

The method involves an of a magnetic field value by a magnetic field sensor or magnetometer as a sensors sensitive for, in particular static, magnetic fields which sensor has three, in particular substantially perpendicular, sensitivity axes and an acquisition of an inclination of the compass with respect to level plane by an accelerometer with at least two, in particular substantially perpendicular, sensitivity axis.

This is done in a discrete set of multiple orientations of the compass, wherein a user guidance for subsequently orienting the compass into a predetermined desired range of orientation is provided by indicating the desired range to the user.

Then, a calculation of compensation data from the magnetic sensor acquisitions to compensate for the influences is done in such a way that a magnetic north heading is determinable based on the compensated magnetic field values, in particular by a compensation algorithm as referenced above.

According to the present invention, the user guidance for the compensation is done with a gathering of directional information based on rotary rate readings from at least one gyroscope for indicating at least an azimuthal component of the orientation, which is in particular a non north referenced, relative orientation.

A bank and/or an elevation component of the orientation for the user guidance can be determined based on the inclination from the accelerometer.

The user guidance can for example be done by a visual indication of an actually aimed direction based on the gyroscope and accelerometer. The indication can also be combined with an information with respect to one of the desired orientations of the discrete set as desired value or as a deviation of actually aimed orientation and desired orientation, for example indicated as value, or by indicating the desired direction of movement to achieve an aiming within the predetermined desired range (as tolerable deviation from the exact desired orientation).

The discrete set of directions can be a desired orientation pattern comprising at least 3, practically for example 4 (hard magnetic compensation only), or in particular at least 7, practically for example 12 (hard and soft magnetic compensation), different orientations to be subsequently aimed (within the tolerable range) and held substantially stable for an acquisition time, in which magnetic field values for the compensation are acquired.

During the compensation measurements in the substantially stable orientation of the set, there can also be done a determination of a bias error or a drift of the gyro, which can be used for correcting the determined drift from gyro readings for the azimuthal user guidance.

The stability and a validity of the aimed direction with respect to the desired direction during the acquisition time can also be monitored according to readings from the accelerometer to detect undesired movements during acquisition time which could falsify the compensation.

A compensable compass according to the invention can be comprised in an observation device, in particular in a handheld observation device. The field compensable electronic geomagnetic compass functionality is achieved by a three axis magnetic field sensor for sensing the strength of a magnetic field, an at least two axis accelerometer as inclination sensor, and a calculation means to determine a relative azimuth heading with respect to a planet's geomagnetic field, based on measurements from the inclination sensor and the magnetic field sensors. Therein the calculation means is built in such a way to compensate the sensed geomagnetic field for deviations by magnetic objects in the vicinity, based on information gathered in a compensation routine.

The compensation routine comprises a subsequent orientation of the device by the user into a set of N>1 orientations, in which magnetic field data for the calculation of the compensation is acquired, wherefore the calculation means is built in such a way to provide a user guidance for orienting the device into predetermined desired orientation ranges as orientations of the set.

Therefore, the device according to the invention comprises at least one gyroscope as rotary rate sensor, and the calculation means is built in such a way that the user guidance during the compensation routine is based on directional information gathered by the at least one gyroscope for at least the azimuthal component of the orientation.

The sensitivity axis of the gyroscope, the accelerometers and the magnetic field sensors have a fixed alignment with respect to each other, in particular wherein at least one of the sensitivity axis of the gyroscope is aligned perpendicular to at least two sensitivity axis of the accelerometer. The sensitivity axis of the magnetic field sensors are also preferably substantially aligned with the directions of the sensitivity axis of the inertial sensors.

The sensitivity axis of the gyroscope can be arranged in such a way that it points substantially downwards (resp upwards) when the device is held leveled, in particular wherein it is substantially coincident or parallel with one of the magnetic sensors sensitivity axis. For the user guidance it is sufficient that the gyroscope has only a single sensitivity axis. In another embodiment, the gyroscope can also have only two sensitivity axes, which is taken into account. If a third gyroscope axis is be present, it can be omitted for the present invention.

The observation device can comprise an electronic and/or optical observation path for visually aiming a target whereof a north referenced azimuth heading is to be determined, in particular a telescopic sight, riflescope, monocular, binocular, night vision system or periscope, preferably wherein the device can also comprise a laser range finder.

The invention also relates to a field compensable digital magnetic compass module, in particular for a handheld observation device, comprising a gyroscope for determining at least an azimuthal orientation, an accelerometer with at least two sensitivity axis for determining inclination, magnetic field sensors for sensing a geomagnetic field in three orthogonal axes, a computation unit providing a magnetic compass compensation routine according to the present invention, and an external communication interface for providing north reference, wherein the abovementioned components are comprised in the digital magnetic compass module as a self-contained module.

Beside this, the invention also relates to the usage of a digital magnetic compass comprising an at least two axis accelerometer and a three axis magnetic sensor, in an observation device comprising a gyroscope for sensing azimuthal orientation and a computation unit built in such a way to provide a user guidance for a compensation routine of the digital magnetic compass according to the invention, wherein a guidance for an azimuthal component of the orientation is based on readings from the gyroscope.

In other words, the invention relates to a usage of a gyroscope for guiding a user to aim an electronic magnetic compass in a desired orientation during a compensation routine for an electronic magnetic compass, wherein the guiding to aim the compass into a set of N≥4 substantially stable subsequent orientations—in particular to aim the device within a tolerable range of each of the orientations, in which orientations magnetic field values for the compensation are acquired—is done with determining an azimuthal component of the orientation of the device according to an integration of rotary rate readings from the gyroscope.

The present invention also relates to a computer program product for carrying out the present invention, in particular comprising program code stored on a machine-readable medium, or a computer-data-signal embodied as an electromagnetic wave, for providing a user guidance for a gathering of compensation data for a magnetic compass in a stored set of predefined orientations, based on readings from an at least a two axis accelerometer and an at least one axis gyroscope, by indicating desired movements of the compass to aim it into the predefined orientation, in particular executed in a digital magnetic compass module or in an observation device.

In a special embodiment, the present invention also involves a method of magnetic north determination by an electronic compass with
- determining a level plane by at least two orthogonally orientated accelerometers as inclination sensors and
- determining magnetic field strength values by three orthogonally orientated magnetic sensors or magnetometers and
- determining a magnetic north reference according to the magnetic field strength values of a geomagnetic field and the level plane, in particular of a line of sight projected into the level plane, wherein the magnetic field strength values are compensated for magnetic field deviations by local influences to the magnetic field by magnetic objects fixed with respect to the compass, based on compensation information gathered in a discrete set of directions according to a desired pattern with at least four different orientations of the compass to be subsequently aimed in a stop and go sequence, wherein each of the directions are held steady for an acquisition time in which magnetic strength values in this direction are determined before the next orientation of the set is aimed.

BRIEF DESCRIPTION OF THE SEVERAL VIEWS OF THE DRAWINGS

The method according to the invention and the devices and setup according to the invention are described or explained in more detail below, purely by way of example, with reference to working examples shown schematically in the drawings. Specifically.

FIG. 3a, FIG. 3b and FIG. 3c are showing some examples of possible embodiments of orientation patterns that can be used for the compensation and user guidance according to the present invention in tabular form;

The diagrams of the figures should not be considered as being drawn to scale. The same reference signs are used for the same or functionally equivalent features throughout the figures.

DETAILED DESCRIPTION OF THE INVENTION

Figure 1:
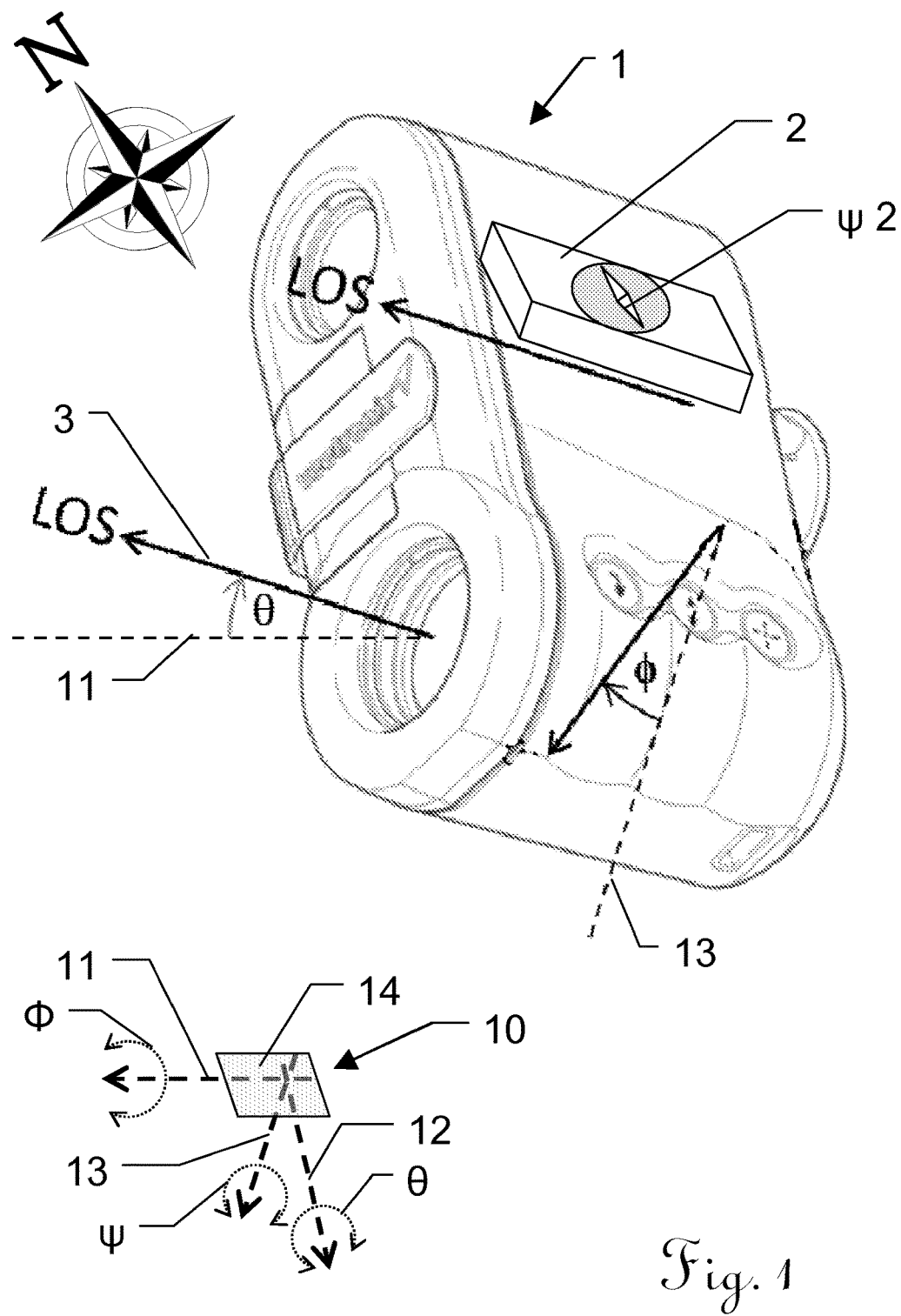
FIG. 1 shows an example of a prior art observation device with a DMC for a prior art magnetic compensation.

FIG. 1 shows an example of an embodiment of prior art, where an electronic compass 2 is used in an observation device 1. The compass 2 is embodied as a Digital Magnetic Compass-module (DMC) comprised by the device 1. The observation device 1 has a Line Of Sight 3 (LOS) as an optical axis of the observation, which can for example be indicated by a reticle, crosshairs or a similar aiming indicator, that can be used for aiming a specific target. The LOS 3 can also be used as axis with respect to which measurement functions of the device, such as for example rangefinding, distance or coordinate determination, determination of bank, elevation, azimuth, etc. is referenced.

Thereby, a coordinate system 10 can be defined, which is for clearness shown outside of the device. The coordinate system 10 has a roll or bank axis 11—which is preferably coincident or parallel to the direction of the LOS 3 when oriented in level plane 14—around which a bank angle φ is defined. Perpendicular thereto is an elevation, altitude or pitch axis 12, around which an elevation angle θ between a level plane and the LOS 3 is defined. The third axis, perpendicular to the two before mentioned axis, is the azimuth, heading or yaw axis 13, which is pointing to the centre of gravity, and around which an azimuth angle ψ as a turn in the level plane is defined—which is to be north referenced by the compass 2.

For a compensation of magnetic sensor readings in the DMC, measurements in multiple orientations of the device are taken, as for example explained in U.S. Pat. No. 6,009,629 or with respect to one of the FIG. 2a, 2b, 2c, 3a, 3b or 3c below. Although gathering of magnetic data for compensation is not restricted to a strictly defined set of orientations which has to be used, there are certain preferred patterns to be at least roughly aimed, which will provide a well conditioned set of measurement data for the compensation—to achieve good compensation results. Some examples of such patterns or discrete sets of multiple orientations (e.g. a number of N) in which data for the compensation is acquired are shown in FIG. 2a, FIG. 2b and FIG. 2c.

Figure 2A:
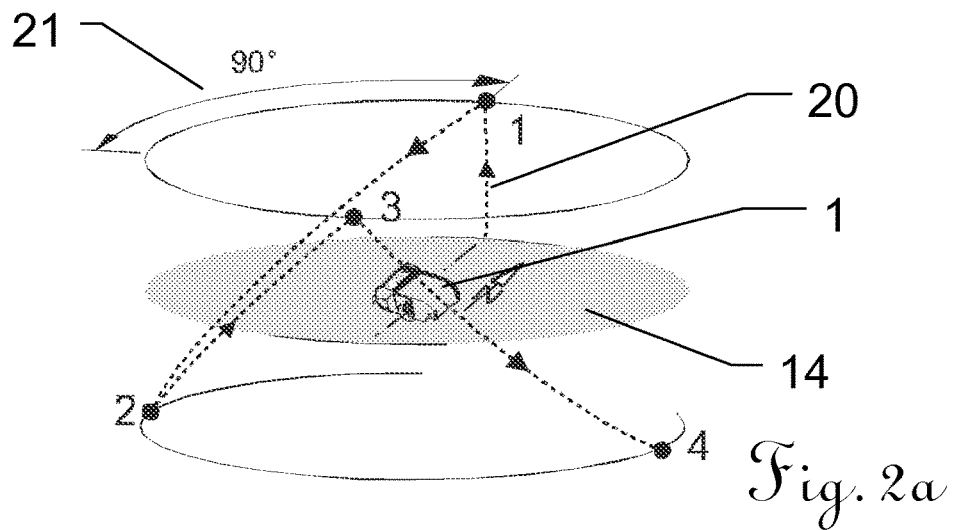
FIG. 2a, FIG. 2b and FIG. 2c are showing some examples of possible embodiments of orientation patterns that can be used for the compensation and user guidance according to the present invention.

FIG. 2a shows a simple example of a compensation pattern, with N=four desired directions to be aimed, which are numbered 1 to 4 and connected by the dotted path 20 indicating a possible device movement. In azimuth there are three 90° turns 21 done, each with a change of elevation to an desired angel below or above level plane 14. With this pattern, it is not possible to achieve a full compensation, but hard magnetic compensation can be done in short time with this quite simple to aim pattern.

Figure 2B:
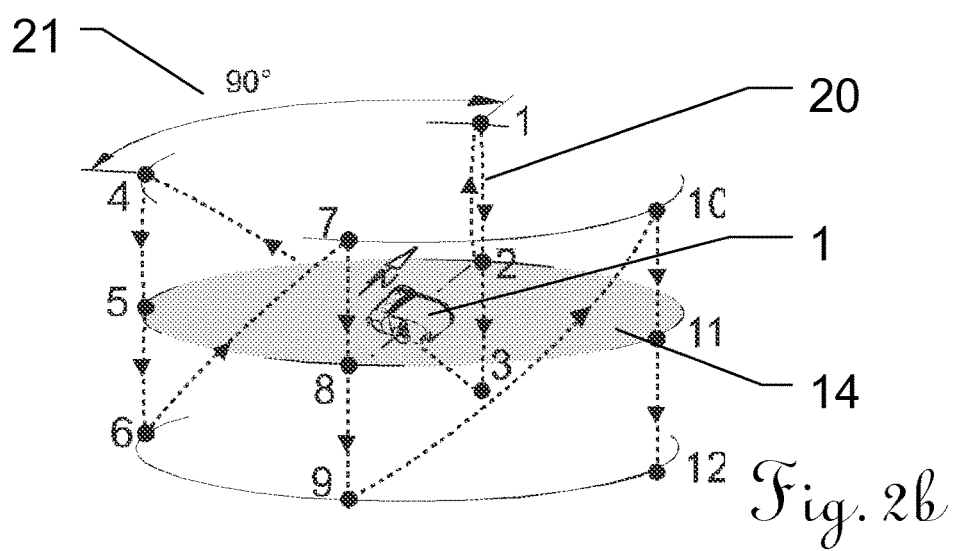
Figure 2C:
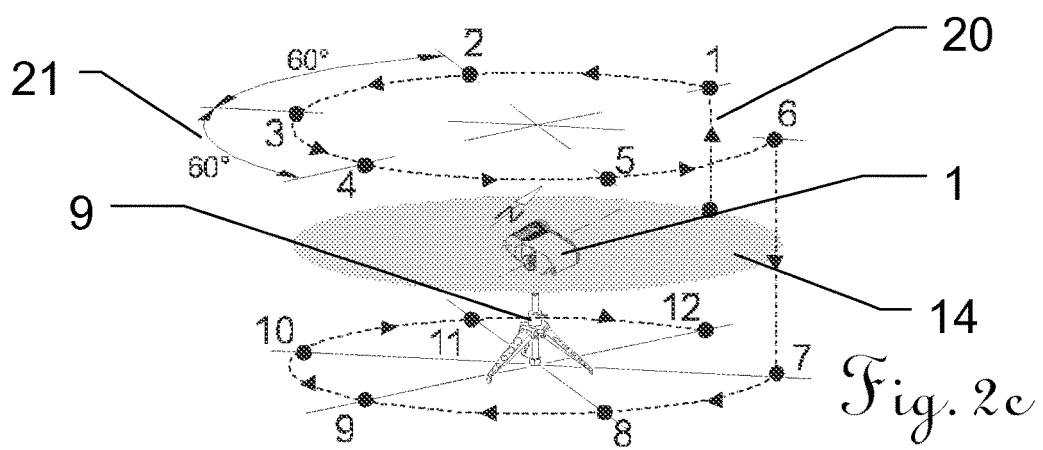

For a full compensation of hard- and soft-magnetic effect, for example the pattern shown in FIG. 2b can be used. For the acquisition of compensation data, the device 1 should be aimed subsequently into the directions of the shown N=12 points (numbered from 1 to 12), in each of which magnetic measurement data is acquired. In this example there are four azimuthal aims or orientations (21), each 90° apart in each of which a below, in, and above level plain 14 orientation in elevation is subsequently aimed.

The number N thereby depends on the compensation to be executed, or more precisely on the number of unknown parameters of the compensation to be determined which can for example be N=7 to N=12 or more for a full hard and soft magnetic compensation or N=3, N=4 or more for a hard magnetic compensation only. More orientations can always be captured and can improve the results due to redundancy, but in view of a quick and easy compensation routine, the abovementioned numbers N are sufficient for a well conditioned compensation from a mathematical point of view, in particular when one of the desired sets of orientations is covered by those N acquisitions.

For the compensation, it is not required to aim at those directions exactly, but compensation will work sufficiently if those orientations are aimed at within a range of about ±10° for bank and elevation and about ±20° for azimuth (or preferably better). While the magnetic data for the compensation is acquired in those aims of the set of the N aims of the desired pattern, which for example can last for about 0.5 up to 1 or a few seconds, the orientation should be held relatively stable, for example within a range of a few tenth of degrees or better. After the acquisition in one orientation, the device is oriented into a next orientation of the sequence, where data is acquired, and so on, until the Nth orientation is covered. The numerical principle used for the compensation does not demand that the succession of the aims exactly follows a predetermined order, but there are certain sequences which are more easy to handle for the user, for example the ones which are shown ± and/or described here, although other patterns can be used as well.

FIG. 2c shows another example of a set of desired aims, where the device 1 is stationed by a tripod 9. Due to the stationing and the possibility to level the tripod 9 and to lock the pitch angle θ, the set of desired aiming is different in this example. The pattern or discrete set of N orientations is azimuthal divided 21 into 60°, covering a circle above and a circle below level plane 14. As mentioned, there are many other alternatives of usable patterns in which compensation data can be gathered and by which a good performance of the compensation algorithm can be achieved.

FIG. 3a shows some other example of desired patterns or sets of roughly to be aimed orientations in each of which a compensation data acquisition is done, in tabular form. The subsequent aims in which compensation data is acquired, are referenced as "Shots", which are defined by their "Azimuth", "Elevation" and "Bank" angles of the to be aimed device orientation.

Depending on the type of observation device and also depending on whether the device is for example handheld and freely movable or mounted somewhere, the desired patterns can vary. In those examples, 12 point full compensation patterns are shown for cases in which the movement of the device 1 is limited to elevation only or bank only. Nevertheless there are some restrictions to those two patterns, like they will not work with start direction at a north referenced azimuth of 45°, 135°, 225° and 315° or they will not work on the equator. As the compensation calculations can also involve a calculation of a figure of merit, such potential problems can also be determined and indicated to the user at the end of compensation, whereon another compensation routine with a different pattern or start position can be executed.

The example shown in FIG. 3b gives another example of a set of preferable aims, where bank and elevation are altered separately. In this example, there is no limitation of the start direction.

The example of FIG. 3c shows another example of a set of orientations to be aimed, when the azimuthal range is limited, e.g. for compensating a compass in a sighting device attached to a gun. As mentioned, there would be further examples of useful patterns for compensation, which tend to achieve a reasonable figure of merit, but can not all be listed here. Those other examples can be determined by a skilled mathematician, based on the algorithm used for the compensation.

To aim the device subsequently at those N orientations of such a set, the observation device 1 provides a user guidance to help the user to aim the device 1 at a reasonable range around those orientation, then trigger the acquisition of data for the compensation while the device is held steady in this orientation (for example such compensation data acquisition can last around 0.5 to 1 second), and then guide the user to move the device into the next orientation of the set, and so on.

The guidance is in general never a serious problem for pitch and roll, as those can be indicated by the inclinations sensors of the DMC to a more than adequate accuracy of degrees or below, which is well within the range example of about ±10° mentioned above.

But for azimuth (yaw), the only data available is the data $\psi_2$ from the to be compensated compass 2 itself. Therefore, it must be assumed that the previous compensation parameters for the compass are sufficiently close, so that at least an approximate azimuth direction $\psi_2$ within acceptable borders can be provided by the wrongly compensated or uncompensated compass, e.g. at least within the ±20° error from the example from above.

Nevertheless, in many cases when a valid compensation is not given, it can therefore not be guaranteed that the magnetic sensor readings can provide azimuth data which is imprecise, but still within a range to be usable for the user guidance for the compensation pattern. This fact is in general not apparent before the compensation routine is started and maybe not even when the device is actually aimed into different orientations (expect an experienced user might become aware that the guidance seems not to guide him to do the "usual" movements).

Accordingly, the guidance for the compensation in prior art can not be executed, if the magnetic disturbances are too high, which is a problem in modern observation devices 1, in particular as the devices are getting smaller in size (r^3 rule of the attenuation of the magnetic field) and as the devices 1 are comprising more electronic equipment, carrying electrical currents that are resulting in magnetic fields. For example, a simple battery exchange can result in an invalidation of the compensation to a level where no compensation guidance is possible any more, due to changed electromagnetic fields due to different amperage and hard- and soft-magnetic constitution of the new battery which is different from the old one.

According to the present invention, this problem in user guidance, which—in worst case—can render the whole compassing function unusable, is overcome.

Figure 4:
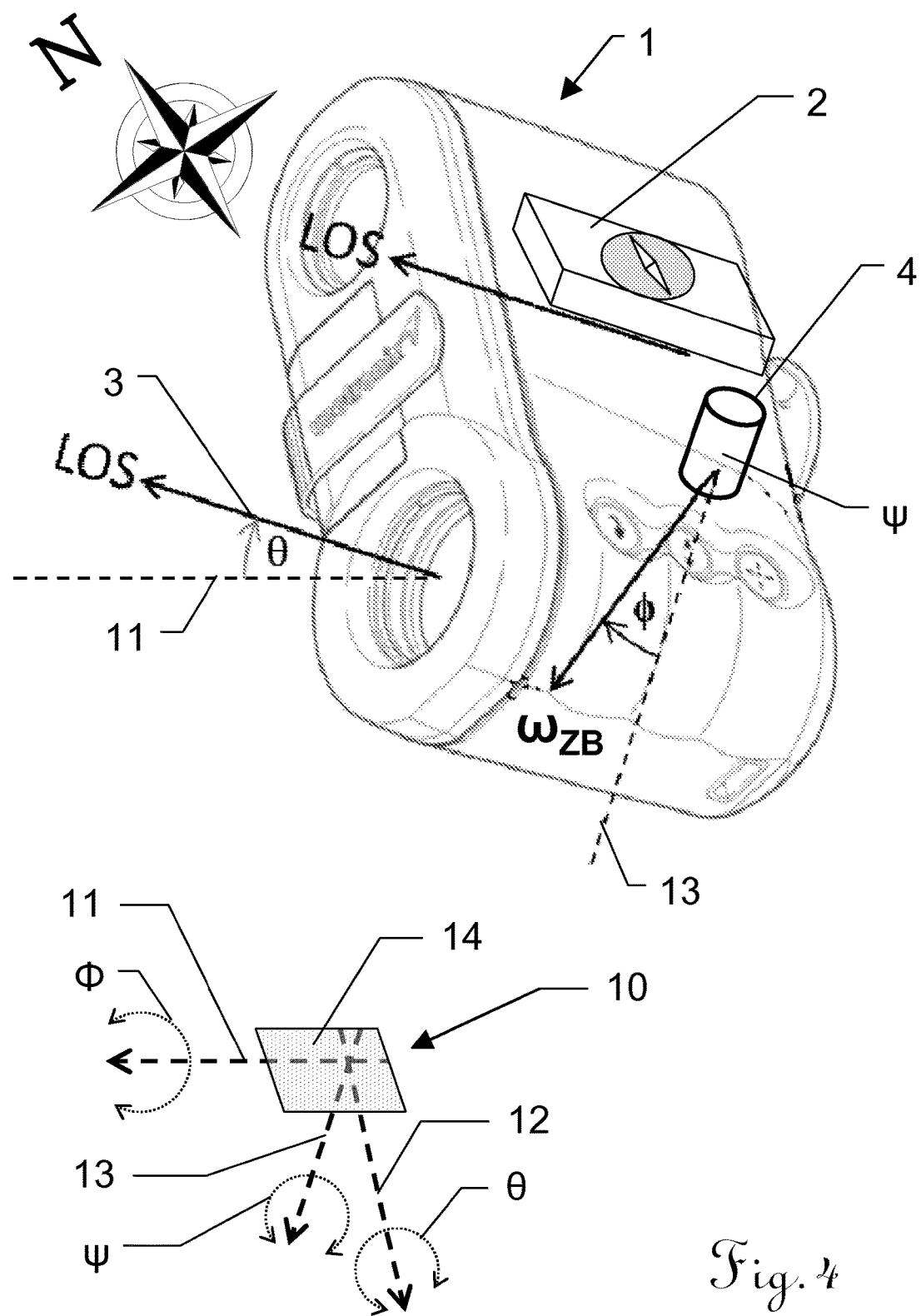
FIG. 4 shows an example of a first embodiment of an observation device for magnetic compass compensation according to the invention.

In the example of the embodiment of the present invention as shown in FIG. 4, the digital magnetic compass 2 (DMC) to be compensated is mounted into an observation device 1, typically with its forward direction closely parallel to the optical axis 3 of the observation. Although there is a gyroscope 4 present, the north determination is still done by magnetic means and not by gyro-compassing based on a determination the rotation axis of the planet—which is a completely different approach.

An example for such a different compassing approach which is not addressed in the present invention can for example be found in U.S. Pat. No. 5,369,889, where a combination of one gyro and two inclinometers is described, which are used in two 180° apart geometrical positions, for the express purpose of determining the geographical north direction by gyrocompassing. The inclinometers are used for geometric projection of the measured earth rotation to horizon as well as for compensation of sinking motions which superpose the correct earth rotation measured by the gyro. There is no magnetic compassing sensor involved and also the gyro-axis is pointing substantially horizontal to determine the horizontal earth rotation vector for determining the geographic north direction based on the planets rotation rate.

As another example of such a different compassing approach, US 2008/0040068 describes a combination of a gyroscopic measurement in substantially vertical direction with two inclinometers to gather information about the wheel/tire and chassis alignment of an automobile. Beside those inertial sensors, there is also no magnetic sensor and no magnetic compassing involved.

Another compassing approach, which is not related to the present invention, can for example be found in U.S. Pat. No. 7,421,340, where a so called IMUs or full featured, 6DOF strapdown navigation module is discussed, which has a gyro pointing into substantial vertical direction and a magnetic compass which are combined for the purpose of pedestrian navigation. The patent concerns a combination of azimuthal information determined by the gyroscope and azimuthal information determined by the DMC, so that—in cases where earth-fixed disturbances of the outer geomagnetic field are occurring during navigation—correct heading information can be sustained. To achieve such a high quality, low drift gyroscope is kept in a vertical direction (as far as possible—with only small deviations due to mounting precision and pedestrian movements) in order to track the pedestrians azimuthal orientation during navigation. For such a navigation purpose, a highly accurate, low drift gyroscope and a filter for the magnetic compass readings are required. According to the present invention, the gyroscope is used for user guidance in the compensation of a magnetic compass and hereafter the north direction can be determined solely based on the magnetic readings, wherefore no highly compensated navigation grade gyroscope is required.

The approach of the present invention does also not try to overcome external earth fixed deviations of the planets magnetic field from the outside like in U.S. Pat. No. 7,421,340, as those can not be compensated in the magnetic sensor readings in the sense of the present invention.

Such IMU navigation approaches are not built in such a way to provide a highly accurate compass calibration by aiming the device into set of desired orientations, where in each of which compensation measurements are gathered and do not comprise computation units for an evaluation and compensation of the sensed magnetic data to provide digital magnetic compassing information.

In the embodiment shown in FIG. 4, the gyroscope is mounted in the observation device 1, but outside of the DMC-module 2 (which can therefore also be a prior art one). The gyroscopes 4 sensitivity axis is pointing substantially in the direction labelled $\omega_{ZB}$, which is perpendicular to the mounting plane of the DMC 2 and the optical axis or Line of Sight (LOS) 3 of the device 1. If the device 1 is held horizontally in normal usage orientation, the direction $\omega_{ZB}$, corresponds to the "downward" direction—so that rotations around an azimuth axis are sensed. The gyroscope 4 or gyro can also be mounted at another location in the device 1, in particular with its sensitivity axis close to the axis of rotation of the device respectively close to the DMC 2.

For the calculation of azimuth differences, by readings from a gyroscope 4, there can for example be used the expressions derived in the book "Strapdown Analytics, Part 1" by Paul G. Savage, Strapdown Associates, Maple Plain, Minn., 2000, ISBN 0971778604 for the time derivative of the azimuth angle $\psi$, $d\psi/dt$, denoted by $\dot\psi$. Due to the relatively short time in which the compensation is acquired, (for example in order of about one minute or less for a 12 point pattern) and the low directional precision needed, the contribution of the earth rotation can be neglected (in middle latitudes, for one minute: $\frac{1}{60}h * 10°/h = 0.17°$), described in the mentioned book, in chapter 3.3.3.1 by $\omega_{iA}$, with i=X, Y, Z and leave only the relative rotation of frame B=body of the observation device 1 with DMC 2 and one (or optionally two) gyros 4 mounted.

From formula (3.3.3.1-3) in the book:
$$\omega_{ZB} = -\dot\Theta \sin\phi + \dot\psi \cos\Theta \cos\phi$$
and solved for $\dot\psi$:

$$\dot\psi = \frac{\omega_{ZB} + \dot\Theta\sin\phi}{\cos\Theta\cos\phi}$$

with
$\dot\psi$ time derivative of azimuth angle
$\omega_{ZB}$ rotational rate measured by z-gyro
$\Theta$ pitch=elevation angle
$\dot\Theta$ time derivative $$\frac{d\Theta}{dt}$$

of pitch=elevation angle
$\phi$ roll angle=-bank

This means that the azimuth rate of change is given by the z-gyro 4 rotation rate, corrected by the rate of change of the pitch angle which was additionally measured the non-zero roll-angle of the observation device 1, projected to the vertical axis by the factor in the denominator.

In order to calculate the azimuth difference between the last compensation direction and the present direction, the above equation needs to be integrated over time:

$$\Delta\psi(t) = \int_{t_i}^{t} \frac{\omega_{ZB} + \dot\Theta\sin\phi}{\cos\Theta\cos\phi} dt \qquad (1)$$

where
$t_i$=time the last compensation measurement i=1, ..., N−1 was finished

As the diverse angles and gyro-output will be available as digital data, sampled at some interval $\Delta t$, the actual expression will consist of some algorithmic method used to numerically integrate sampled data. Such expressions are state of the art and can be retrieved from various sources, for example in the book "Numerical Recipes" by W.H. Press et. al., Cambridge University Press 2007, ISBN 978-0-521-88068-8.

Figure 5:
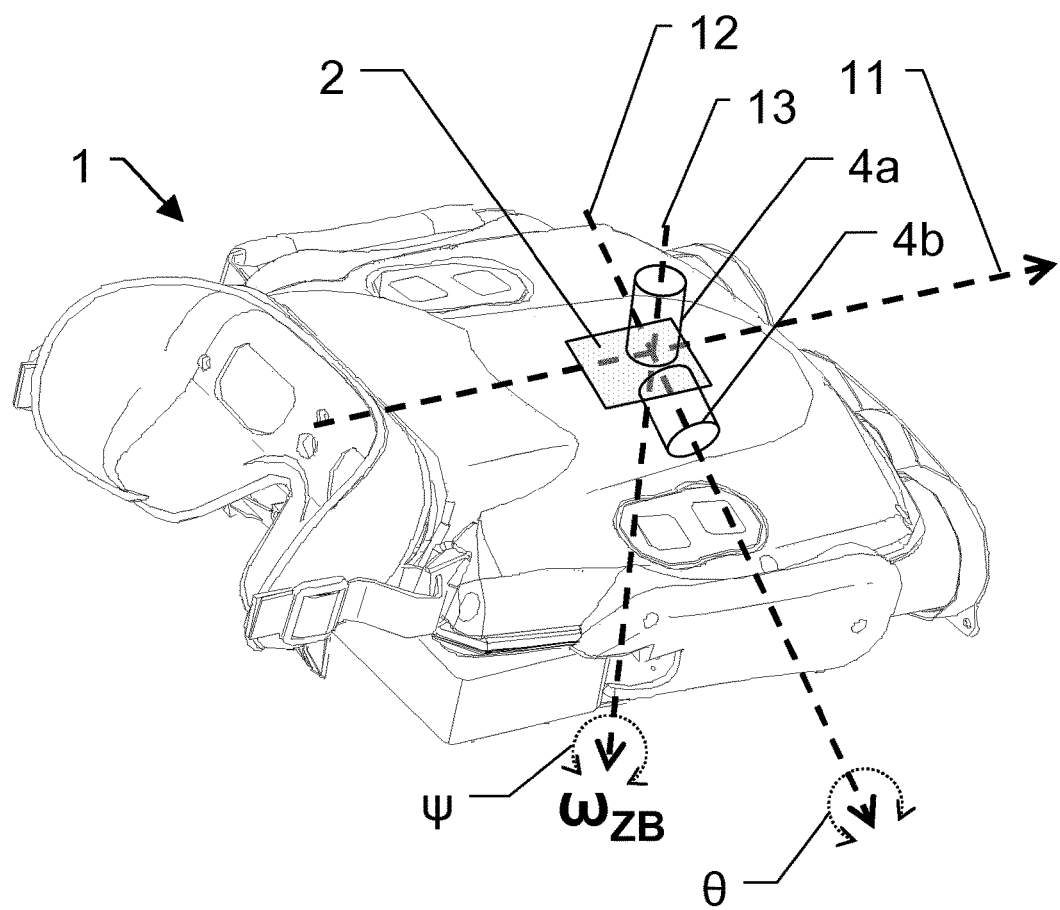
FIG. 5 shows an example of a second embodiment of an observation device for magnetic compass compensation according to the invention.

If a two axis gyro 4 is available, as in the example of FIG. 5, the expression for $\dot\psi$ given in formula 3.3.3.2-4 of the "Strapdown Analytics" book can be used, as above neglecting the earth rotation $\omega_{iA}$, i=X, Y, Z:

$$\dot\psi = \frac{\omega_{ZB}\cos\phi + \omega_{YB}\sin\phi}{\cos\theta}$$

and therefore $$\Delta\psi(t) = \int_{t_i}^{t} \frac{\omega_{ZB}\cos\phi + \omega_{YB}\sin\phi}{\cos\Theta} dt \qquad (2)$$

with $\omega_{YB}$ rotational rate measured by y-gyro

Figure 6:
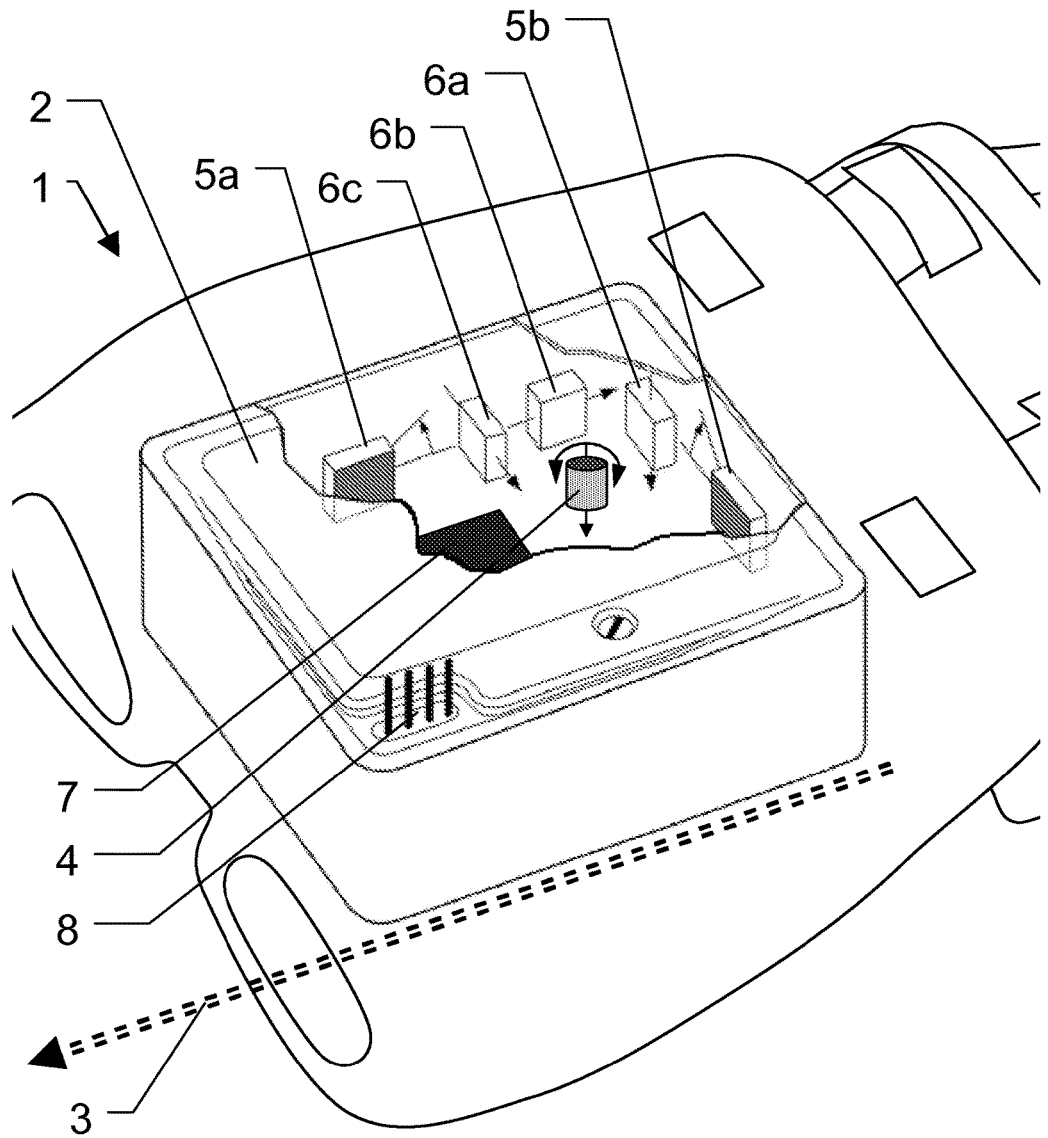
FIG. 6 shows an example of a third embodiment of an observation device with a DMC-module for magnetic compass compensation according to the invention.
Figure 6:
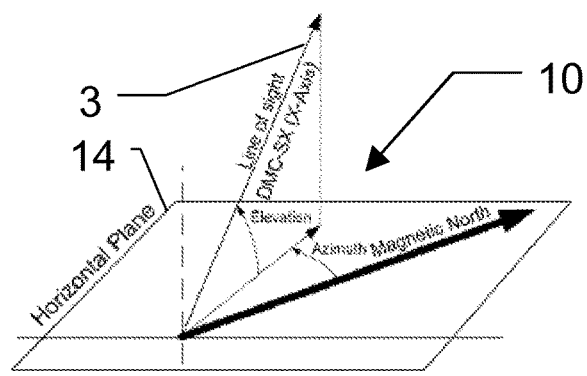

In particular MEMS (Micro Electro Mechanical Sensor) gyroscopes are qualified to be used in observation devices or DMC-modules due to their small size and low weight, which are favourable criteria for the integration into mobile or handheld equipment. Due to the small size, a MEMS gyroscope for a compensation according to the present invention can also be integrated into the housing of an existing DMC-module as shown in FIG. 6. Furthermore, the costs of such MEMS gyroscopes are low compared to mechanical or fiberoptic gyroscopes.

Bias stability, as major quality indicator of a gyroscope 4, and, especially with low-cost gyroscopic sensors 4, the gyro bias can be a problem. For example, such low-cost devices cannot be fully calibrated in factory. They will have different characteristics at each turn-on and will even drift away during use. Latter will not be a severe problem in the present invention due to the short times between the aimed geometric positions (e.g. in the range of a few seconds). Nevertheless, the former can become critical.

For example, in a typical embodiment of a MEMS gyro 4, like the ADXRS450 from Analog Devices, the "Null" Accuracy is specified in its datasheet as ±3°/s. Taking this example, the desired guiding accuracy of at most 20° can be reached after 20°/3°/s=7 s, which may be too soon in case of a slowly rotating user trying to aim the subsequent orientation for compensation data acquisition.

In order to reduce negative effects by this drift, the latest gyro offset should be determined and taken into account. As the user needs to keep the device still during some time $\Delta t_C$ at the geometric positions to acquire the magnetic sensor information anyway, this opportunity can also be used to determine the gyro bias $\omega_{ZB0}$ during the compensation measurement, by averaging the gyro output during this time. As an indication that the device is actually kept still, also the measurements from the accelerometers can be taken into account.

$$\omega_{kBi} = \frac{1}{\Delta t_C} \int_{t_i - \Delta t_C}^{t_i} \omega_{ZBi} dt \approx \frac{1}{N_C} \sum_{j=1}^{N_C} \omega_{kBj},$$

$$k = Z \text{ or } Y, i = 1, 2, \ldots, N$$

where
$\Delta t_C$: magnetic compensation measurement time
$N_C$: $\Delta t_C * f_{Gyro}$ Gyro measurements at sampling frequency $f_{Gyro}$ during this time Due to the low noise of the gyroscope measurement, even the relatively short time $\Delta t_C$ for compensation measurement will provide adequate offset accuracy for the purpose of guiding the user into the desired range of the compensation acquisition directions according to the present invention.

In the mentioned example of the ADXRS450, the noise density is listed as 0.015°/s/√Hz. For a time $\Delta t_C$=0.5 s, the standard deviation of the average amounts to $s_{\omega kBi} = 0.015/\sqrt{0.5} = 0.02°/s$ which is accurate enough for the purpose of this invention.

Subsequently, the formulas (1) and (2) can be used in modified form:

$$\Delta \psi(t) = \int_{t_i}^{\tau} \frac{(\omega_{ZB} - \omega_{ZB0}) + \Theta \sin\phi}{\cos\Theta \cos\phi} dt \quad (3)$$

$$\Delta \psi(t) = \int_{t_i}^{\tau} \frac{(\omega_{ZB} - \omega_{ZB0})\cos\phi + (\omega_{YB} - \omega_{YB0})\sin\phi}{\cos\Theta} dt \quad (4)$$

Depending on the intrinsic stability of the gyro 4, the already obtained $\omega_{kBi}$ can be averaged directly or in a robust fashion in order to remove possible outliers, with methods well known by a skilled person (for example as explained in the above cited book "Numerical Recipes").

As the times between the desired geometric orientations for the compensation according to the invention are short anyway, and in particular, if an improved gyro, with lower drift and noise ratings than the above-mentioned ADXRS450 is used, the abovementioned determination of the offsets may not even be necessary and the guidance according to the invention can be done based on uncompensated gyroscope readings.

In another example of an embodiment shown in FIG. 5, a two axis gyro 4a and 4b is used, whereof one axis points in the above mentioned $\omega_{ZB}$ direction (downward), while its other axis points in a direction perpendicular to the optical axis or LOS, in the mounting plane. With the device 1 in horizontal position, the second sensitivity axis of the gyroscope 4b points in horizontal direction—so that rotations around an elevation axis 12 are sensed. The inclusion of such data from a second gyroscope 4b in the used algorithms was already mentioned in the formulas above. The calculation of angular movements based on gyroscope readings—as explained above—can also be applied to the other axis in a similar manner.

In yet another example of an embodiment shown in FIG. 6, the gyroscope 4, with at least one sensitivity axis pointing sustainable perpendicular to the device-coordinate-systems level plane defined by the axis of the accelerometers 5a, 5b and magnetometers 6a, 6b, 6c, is integrated into the DMC-module 2 forming a self contained digital compass module with the at least azimuthal gyroscope 4. The computation unit 7 within the module 2 can handle the compensation routine including the provision of guidance information for the compensation pattern, for example in form of desired and actual orientation of the device comprising the DMC 2, the difference thereof, etc. by its communication interface 8.

In other embodiments—as e.g. the one of FIG. 4—the computation of the user guidance can also be done by a computation unit outside of the DMC-module 2, for example a microprocessor operating the user display or other device functionality.

An embodiment of the present invention can be done with a minimal hardware count of:
- a dual axis only accelerometer for determining two inclinations with respect to level plain,
- a single axis only gyroscope with its sensitivity axis substantially orthogonal to the plain of the two accelerometer axis,
- a three axis magnetic sensor with its axis pointing substantially into the directions of abovementioned sensors (or at least with a known, orientation with respect to those that can be numerically compensated for) and
- a computation unit for evaluating measurements from the sensors above, which provides a compensation routine for the magnetic sensor readings in order to compensate magnetic field deviations and to determine the local geomagnetic north direction, wherein a guidance of the compensation routine in azimuthal direction is done based on readings from the gyroscope.

For the present invention, no additional sensors than the ones above are required—although there can be additional sensitivity axis of those sensors in other embodiments.

Such another embodiment of the present invention can for example comprise:
- a dual or triple axis accelerometer for determining two inclinations with respect to level plain as elevation and bank, a dual axis only gyroscope with one sensitivity axis substantially orthogonal to the plain of the two accelerometer axis determining a rotation rate in azimuth and the other in the plane determining a rotation rate in elevation, a three axis magnetic sensor with its axis pointing substantially into the directions of abovementioned sensors (or at least with a known, orientation with respect to those that can be numerically compensated for)

a computation unit for evaluating measurements from the sensors above, which provides a compensation routine for the magnetic sensor readings in order to compensate magnetic field deviations and to determine the local geomagnetic north direction, wherein a guidance of the compensation routine in azimuthal direction is done based on readings from the gyroscope.

In yet another embodiment, there might be additional sensitivity axis at the gyroscope and/or accelerometer, but for compensation and compensation guidance according to the present invention, those additional sensor values can be omitted. For the present invention, there is also no need for a navigation-grade gyroscope, but a medium to low quality one axis gyroscope in MEMS-technology can be sufficient, in particular if the drift-error during the (short-term) compensation is low enough and/or a offset determination in the substantially stable compensation direction aims (e.g. as described above) is done in cases when the desired gyroscopic azimuth guidance accuracy (of e.g. at least about ±20°) is not achieved anyway.

In other words, the invention can be described as a method where a single or two-axis MEMS gyro (which can be of low accuracy and stability) provides azimuth information for a user guidance during compass calibration, in particular also when the uncompensated compass can not provide sufficiently precise azimuth data for such a compensation. For this purposes, the output of the gyro(s) is combined with the inclination information from the accelerometers in the compass-module by a mathematical algorithm. This allows the calculation of relative azimuth-difference between each of the compensation orientations, as needed for a guidance of the user to aim the device into a sequence of desired directions to gather data for the compensation. By this the azimuth angle accuracy of the user guidance of a magnetic compensation procedure for a digital magnetic compass is improved or made possible also in case of severe magnetic disturbances, by the utilisation of a one- or two-axis gyro and calculations involving the gyro-output and the inclination sensor data for a user guidance for the compensation of the digital magnetic compass.

The invention claimed is:

1. A method for a field compensation of an electronic magnetic compass, comprising:
    orienting an electronic magnetic compass into a first orientation;
    measuring a first magnetic field value at the first orientation by a magnetic field sensor with three perpendicular, sensitivity axis, the magnetic field sensor configured to detect a geomagnetic field;
    measuring a first inclination with respect to a level plane at the first orientation by an accelerometer with at least two perpendicular, sensitivity axis, the accelerometer configured to detect a current inclination of the electronic magnetic compass in the first orientation;
    providing at least one visual user guidance to the user for orienting the electronic magnetic compass into at least one second orientation, the at least one second orientation being different from the first orientation;
    measuring a second magnetic field value at the at least one second orientation by the magnetic field sensor;
    measuring a second inclination at the at least one second orientation by the accelerometer;
    measuring a rotation of the electronic magnetic compass between the first orientation and the at least one second orientation by a gyroscope;
    wherein the at least one visual user guidance provides guidance to turn the electronic magnetic compass into the at least one second orientation that is within a predetermined desired range of orientations;
    calculating compensation data from the first magnetic field value of the first orientation and the second magnetic field value of the at least one second orientation to compensate a subsequent measured magnetic measure field value of the magnetic field sensor for influences to the geomagnetic field by magnetic objects in a vicinity of the electronic magnetic compass, and determining a magnetic north heading based on the compensated subsequent measured magnetic field value.

2. The method according to claim 1, wherein the at least one visual user guidance for the compensation is done with an indication of a bank or an elevation component of the respective orientation based on the respective inclination from the accelerometer and a visual indication of a actually aimed direction based on the gyroscope and accelerometer combined with a desired orientation or a deviation thereof.

3. The method according to claim 1, wherein the first orientation and the at least one second orientation form a desired orientation pattern comprising at least 3 different orientations to be subsequently aimed at and held stable for an acquisition time.

4. The method according to claim 3, further comprising:
    determining a bias error of the gyroscope during compensation measurements in the stable orientation during the acquisition time and correcting the determined bias error from the gyroscope for an azimuthal user guidance.

5. The method according to claim 3, further comprising:
    monitoring of a stability and a validity of the aimed direction with respect to the desired direction during the acquisition time according to readings from the accelerometer.

6. The method of claim 1, wherein the rotation of the electronic magnetic compass between the first orientation and the at least one second orientation is one of an azimuthal rotation or an azimuth rotation difference.

7. A handheld observation device with a field compensatable electronic geomagnetic compass, comprising:
    a three axis magnetic field sensor for sensing a strength of a magnetic field,
    an at least two axis accelerometer as an inclination sensor, and
    a calculation means to determine a relative azimuth heading with respect to a planet's geomagnetic field based on measurements from the inclination sensor and the magnetic field sensor,
    wherein the calculation means is configured to compensate the sensed geomagnetic field for deviations by magnetic objects in the vicinity based on information gathered in a compensation routine, the compensation routine comprises a set of N>1 orientations of the device, in which magnetic field data for the calculation of the compensation is acquired, and wherein the calculation means is configured to provide a visual user guidance to a user for orienting the device into predetermined desired orientation ranges as orientations of the set, wherein the device comprises at least one gyroscope as a rotary rate sensor for deriving an azimuth difference between the set of orientations of the device, and the calculation means is configured to base the visual user guidance during the compensation routine on directional information gathered by the at least one gyroscope for the azimuthal difference of the set of orientations of the device and by the inclination from the at least two axis accelerometer, and wherein the compensation routine comprises orienting the A handheld observation device into a first orientation of the set of orientations, measuring a first magnetic field value at the first orientation by the three axis magnetic field sensor, measuring a first inclination with respect to a level plane at the first orientation by the at least two axis accelerometer.

8. The device according to claim 7, wherein the sensitivity axis of the gyroscope, the accelerometer and the magnetic field sensor have a fixed alignment with respect to each other, and wherein at least one of the sensitivity axis of the gyroscope is aligned perpendicular to at least two sensitivity axes of the accelerometer and the sensitivity axes of the magnetic field sensor are also aligned in those three directions.

9. The device according to claim 7, wherein the sensitivity axis of the gyroscope approximately coincides with the pivot of the azimuthal movement by the user or with one of the magnetic sensors sensitivity axis.

10. The device according to claim 7, wherein the gyroscope or the accelerometer are MEMS (Micro Electro Mechanical Sensor) components.

11. The device according to claim 7, wherein the gyroscope has only a single sensitivity axis or the gyroscope has only a dual sensitivity axis.

12. The device according to claim 7, wherein the observation device comprises an electronic or optical observation path for visually aiming a target whereof a north referenced azimuth heading is to be determined, and a laser range finder.

13. A hand held observation device with a field compensatable electronic geomagnetic compass, according to claim 7, comprising a non-transitory computer readable medium encoded with a computer program containing instructions stored therein for causing a computer processor to determine the relative azimuth heading with respect to the planet's geomagnetic field.

14. A field compensatable digital magnetic compass module in a self-contained module, for a handheld observation device, comprising:
a gyroscope for determining an azimuthal difference in orientation,
an accelerometer with at least two sensitivity axes for determining an inclination,
a magnetic field sensor for sensing a geomagnetic field in three orthogonal axes,
a computation unit providing a magnetic compass compensation routine, and
an external communication interface for providing north reference and for providing a visual user guidance for orienting the field compensatable digital magnetic compass module into a predetermined number of orientations for the magnetic compass compensation routine, the visual user guidance being based on the azimuthal difference in orientation determined by readings of the gyroscope and the inclination, and wherein the magnetic compass compensation routine comprises orienting the field compensatable digital magnetic compass module into a first orientation, measuring a first magnetic field value at the first orientation by the magnetic field sensor, measuring a first inclination with respect to a level plane at the first orientation by the accelerometer.

15. A digital magnetic compass comprising:
an at least two axis accelerometer configured to detect a current inclination of the digital magnetic compass;
a three axis magnetic sensor configured to detect a geomagnetic field;
wherein the digital magnetic compass is integrated into an observation device comprising a gyroscope for sensing azimuthal orientation and a computation unit and a display configured to provide a visual user guidance for a compensation routine of the digital magnetic compass;
wherein the visual user guidance comprises a displayed guidance for an azimuthal component of the azimuthal orientation is based on readings from the gyroscope; and
wherein the compensation routine comprises orienting the digital magnetic compass into a first orientation, measuring a first magnetic field value at the first orientation by the three axis magnetic sensor, measuring a first inclination with respect to a level plane at the first orientation by the at least two axis accelerometer.

16. A method for using a gyroscope for guiding a user to aim a magnetic compass in a desired orientation during a compensation routine for the magnetic compass, comprising:
visually guiding a user to aim a magnetic compass into a first orientation of a set of N≥3 approximately stable subsequent orientations;
measuring a first magnetic field value at the first orientation by a magnetic field sensor with three perpendicular sensitivity axis, the magnetic field sensor configured to detect a geomagnetic field;
providing at least one visual user guidance to the user for orienting the magnetic compass into successive orientations up to N, each of the successive orientations being different from each other of the successive orientations;
measuring a plurality of magnetic field values by the magnetic field sensor, one of the plurality of magnetic field values measured at each of the successive orientations;
determining an azimuthal component of each of the successive orientations of the device according to an integration of rotary rate readings from the gyroscope, and wherein the at least one visual user guidance indicates the device is within a tolerable range of each of the successive orientations.

* * * * *